(No Model.)  2 Sheets—Sheet 1.
G. W. EVANS.
TREAD POWER.
No. 371,830. Patented Oct. 18, 1887.
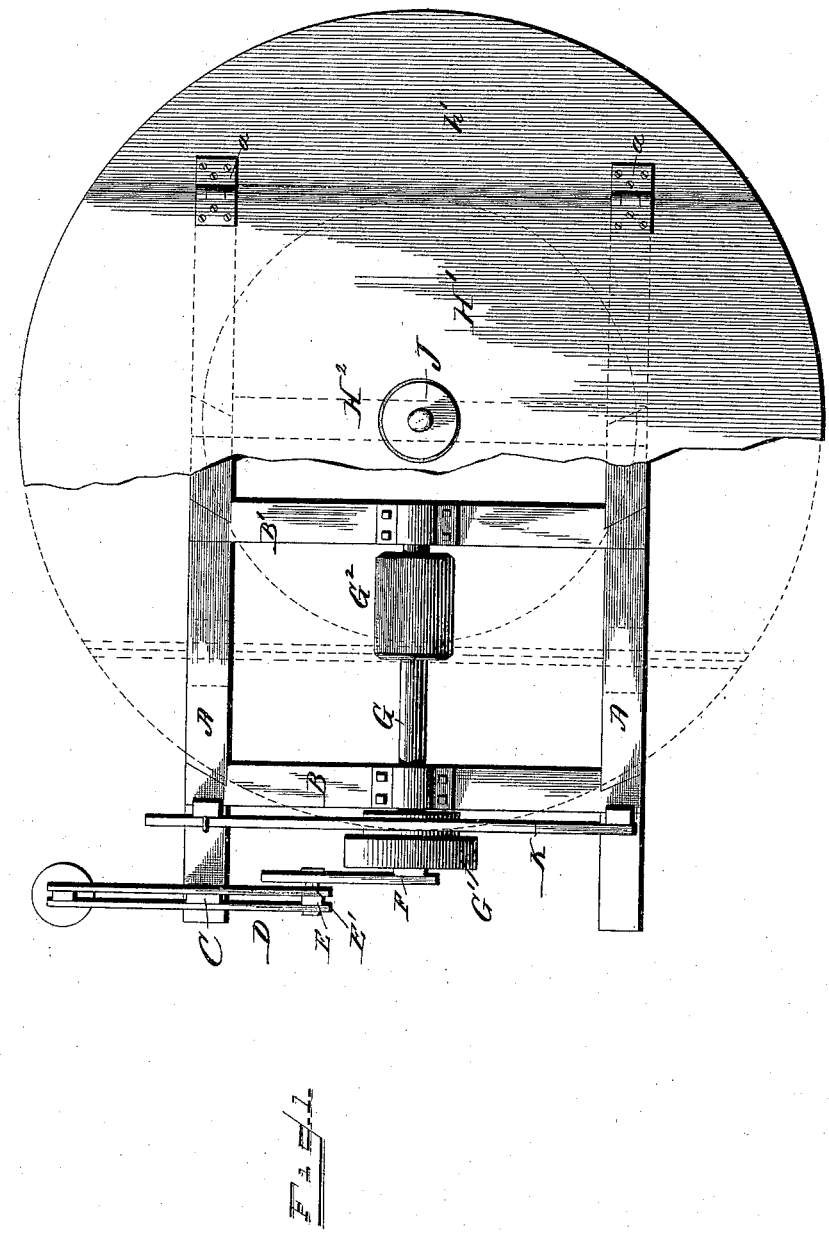
WITNESSES
G. S. Elliott.
E. W. Johnson.
George W. Evans.
INVENTOR
Attorney (No Model.) 2 Sheets—Sheet 2.
G. W. EVANS.
TREAD POWER.
No. 371,830. Patented Oct. 18, 1887.
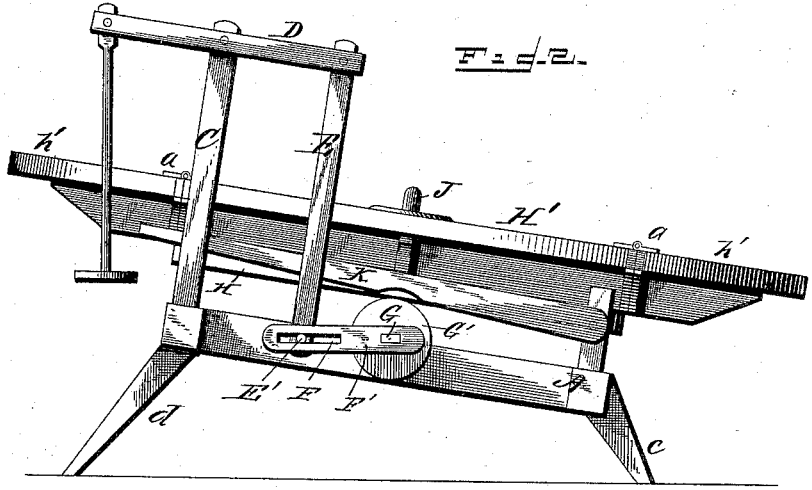
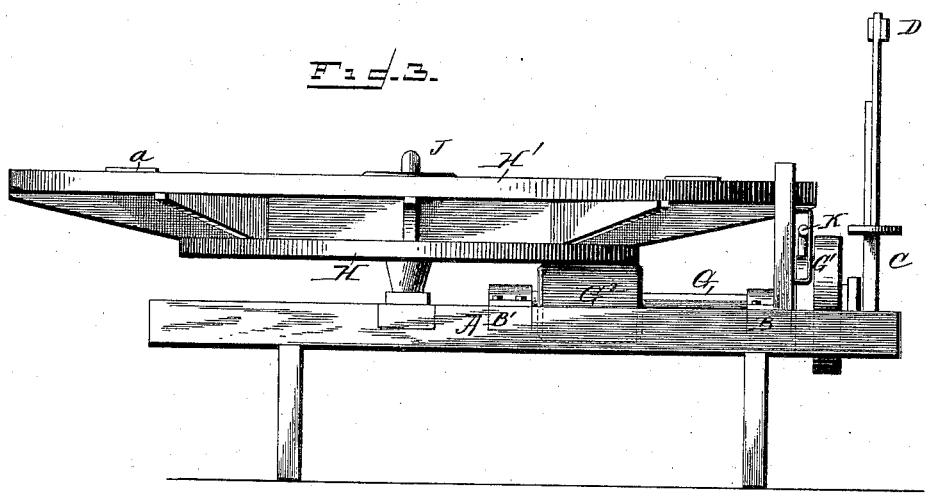

UNITED STATES PATENT OFFICE.

GEORGE W. EVANS, OF WEST UNION, WEST VIRGINIA.

TREAD-POWER.

SPECIFICATION forming part of Letters Patent No. 371,830, dated October 18, 1887.

Application filed September 9, 1886. Serial No. 213,076. (No model.)

*To all whom it may concern:*

Be it known that I, GEORGE W. EVANS, a citizen of the United States of America, residing at West Union, in the county of Doddridge and State of West Virginia, have invented certain new and useful Improvements in Tread-Powers, of which the following is a specification, reference being had therein to the accompanying drawings.

My invention relates to certain new and useful improvements in tread-powers; and it consists in an inclined circular tread-wheel having a raised circular bearing adapted to move on a friction-pulley rigidly attached to a horizontal shaft, by which power is imparted to machinery through a belt or crank connected with said shaft.

The object of my invention is to obviate the use of gear-wheels in a tread-power and to fold up and contract the machine for transportation; also, to change the inclination of the frame by pivoted or hinged legs. I attain these objects by means of the peculiar construction and arrangement of the various parts, which will be more fully pointed out and described in the specification and claim, reference being had to the drawings accompanying this application and forming part of the same, in which—

Figure 1 is a top plan view showing the tread-platform broken away. Fig. 2 is a side elevation of the machine. Fig. 3 is an end view thereof.

Similar letters refer to like parts throughout the drawings.

Referring to the drawings, A represents a frame having cross-bars B and B'. Mounted on top of said frame is an upright post, C, on the top of which is pivoted a walking-beam, D, the outer end of which is pivoted to a connecting-rod, the inner end of said walking-beam being pivoted to a connecting-rod, E, the opposite end of said rod being pivoted to a crank-pin, E', that is secured in a slot, F, formed in crank F', said crank being rigidly secured to the outer end of shaft G, and close to crank F' is secured a drive-pulley, G', on shaft G. Shaft G is journaled on cross-bars B and B', and between said bars is secured to shaft G a friction-wheel, G², which is formed to contact with a circular friction-wheel, H, rigidly secured to the under side of and of a diameter equal to the width of a straight-sided tread-frame, H'. This wheel and tread-frame are mounted to rotate on a journal-stud, J, projecting upward from a cross-bar, H², secured to frame A, beside and parallel to the cross-beam B', the parts being so proportioned that the rim of wheel H will constantly rest upon the friction-drum G², as shown in Fig. 3. To the straight sides of the tread H' are secured, by hinges *a a*, wings *h'*, shaped and designed to complete the circular contour of the tread when unfolded or extended, as in Figs. 1 and 3, or to be folded upon the surface of the tread H', to reduce its diameter for purposes of transportation or storage.

A brake-lever, K, is pivoted at one end to a standard rising from frame A, its other or free end passing through a guide-loop secured to a standard at the opposite side of the machine. This second standard is provided with a vertical series of perforations adapted to receive a pin, which will serve to hold the brake-lever in contact or out of contact with the pulley G', as occasion may demand, the purpose of this construction being to connect the tread to the drive-shaft by frictional contact, instead of gear-wheels, whereby a cheap and durable power may be constructed, also to a great degree noiseless. Frame A is also provided with short legs, *c*, on one side of the frame, and on the opposite side of the frame are hinged longer legs, *d*, whereby when all the legs are in use the inclination downward is toward the short legs, and when the long legs *d* are folded up or out of the way the side of the frame A rests on the ground and the short legs incline the frame in opposite direction.

Having thus described my invention, what I claim, and desire to secure by Letters Patent, is—

In a horse-power tread, the combination, substantially as described, of the frame carrying a horizontal shaft having a friction-drum and an upright journal-stud, a tread-frame having parallel straight edges at opposite sides and provided on its under side with a friction-wheel of a diameter equal to the width of the frame, and side wings hinged to the straight edges of the tread-frame.

In testimony whereof I affix my signature in presence of two witnesses.

GEORGE W. EVANS.

Witnesses:
 Z. ASH,
 JOHN J. INGLE.